Sept. 16, 1958    W. P. McCORMICK    2,851,947
SCREEN PRINTING APPARATUS

Filed Feb. 11, 1955    6 Sheets-Sheet 1

Inventor
WILLIAM PHILIP McCORMICK
By Young, Emery
& Thompson
Attorneys

Sept. 16, 1958　　　W. P. McCORMICK　　　2,851,947
SCREEN PRINTING APPARATUS

Filed Feb. 11, 1955　　　　　　　　　　　　　6 Sheets-Sheet 3

Inventor
WILLIAM PHILIP McCORMICK
By Young Emery & Thompson
Attorneys

Sept. 16, 1958   W. P. McCORMICK   2,851,947
SCREEN PRINTING APPARATUS
Filed Feb. 11, 1955   6 Sheets-Sheet 4

*Inventor*
WILLIAM PHILIP McCORMICK
By Young, Emery
& Thompson
*Attorneys*

Sept. 16, 1958  W. P. McCORMICK  2,851,947
SCREEN PRINTING APPARATUS
Filed Feb. 11, 1955  6 Sheets-Sheet 5

*Inventor*
WILLIAM PHILIP McCORMICK
By *Young Emery & Thompson*
*Attorneys*

Sept. 16, 1958　　　W. P. McCORMICK　　　2,851,947
SCREEN PRINTING APPARATUS
Filed Feb. 11, 1955　　　　　　　　　　6 Sheets-Sheet 6

Inventor
WILLIAM PHILIP McCORMICK
By Young, Emny
 + Thompson
　　　Attorneys

United States Patent Office 2,851,947
Patented Sept. 16, 1958

2,851,947

SCREEN PRINTING APPARATUS

William Philip McCormick, Glasgow, Scotland

Application February 11, 1955, Serial No. 487,646

Claims priority, application Great Britain August 4, 1954

15 Claims. (Cl. 101—122)

This invention relates to screen printing apparatus of the type in which the stencil of a pattern is incorporated in a screen, a surface of the screen is applied to a cloth, paper, plastic or other fabric and printing ink is fed to the other surface of the screen and squeezed through the screen upon the fabric, after which the screen and printed fabric are separated.

An object of the present invention is to provide an improved apparatus comprising a continuously operating screen-printing machine adapted to use an endless flexible printing screen incorporating the stencil of a pattern, the material of the stencil being embedded in or affixed to the structure of the screen.

The invention is a screen printing machine comprising rotatable impression, pressure and guide rollers, the pressure and guide rollers being adapted to be wrapped by an endless flexible printing screen and the impression roller being arranged so that an arcuate zone of it supports the screen between the other rollers, a conduit for feeding printing ink to the screen above said zone, a device applicable to the screen at the end of said zone for squeezing the printing ink through the screen, mechanism for continuously rotating the pressure roller and releasable means for forcing one of the impression and pressure rollers towards the other to form at the start of said zone a nip by which the screen will be forced to travel round said zone from the nip to the ink-squeezing device, there leaving the impression roller and returning around the guide and pressure rollers.

It will be apparent that the fabric to be printed is led to, around and from the impression roller, passing between the printing screen and the surface of the impression roller and being subjected in its passage to the action of the nip and of the ink-squeezing device.

The assembly constituted by the pressure and guide rollers may have provision to ensure the maintenance of precise alignment of the printing screen. The provision takes the form of means for angularly adjusting the axis of one of said rollers in relation to the practically parallel axis of the other.

Preferably, the pressure roller is journalled in stationary bearings to rotate about an axis that is constant whereas the guide roller is journalled at opposite ends to rotate in bearings which are adjustable as a pair to and from the pressure roller to vary the light tension under which the printing screen is supported. Moreover, one of the guide-roller bearings may be adjustable relatively to the other to provide for maintenance of precise alignment of the printing screen.

Preferably, the pressure roller is journalled in stationary bearings to rotate about an axis that is constant whereas the impression roller is journalled to rotate in bearings which are movable and which are subjected to the force of the means by virtue whereof the impression roller forms the nip with the pressure roller. The bearings at opposite ends of the impression roller may be subjected to forces applied by separate devices which are independently controlled to regulate the distribution of pressure throughout the extent of the nip.

The invention also is a screen printing machine as hereinbefore described in combination with a patterned endless flexible printing screen comprising fine metal wires woven as a web which is cut to a selected length and the ends of which are interconnected to form an endless substantially continuous warp-and-weft structure.

An example of a screen printing machine according to the invention will now be described with reference to the accompanying drawings in which.

Figure 1:
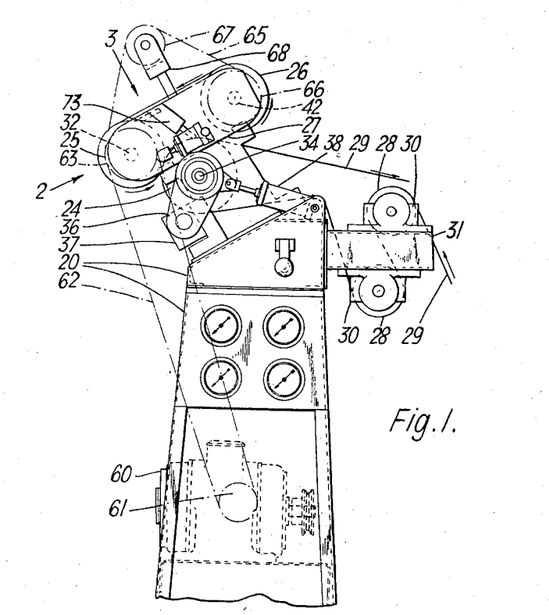
Fig. 1 is a side elevation of the machine.
Figures 15, 16, 17:
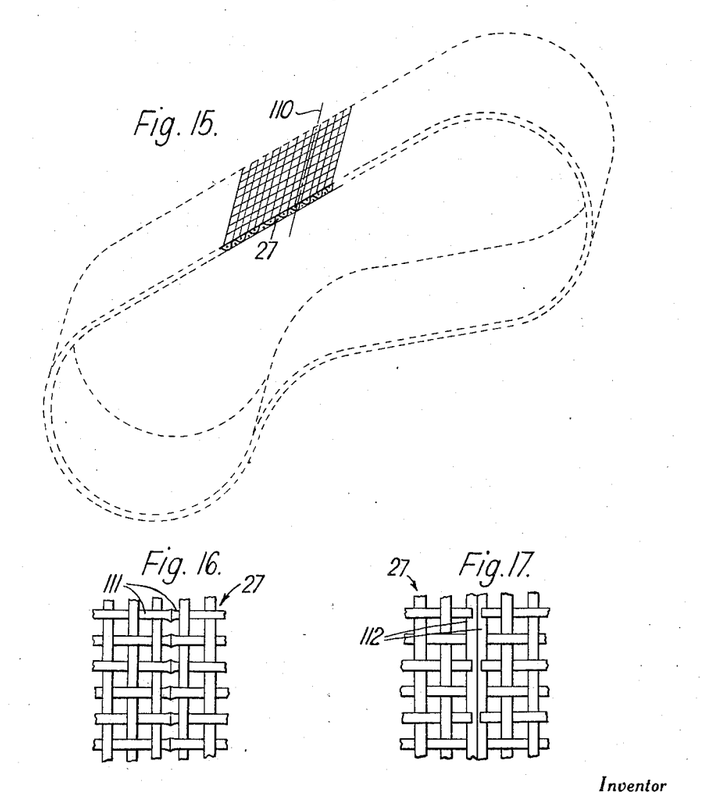
Fig. 15 is a diagrammatic perspective view of a narrow portion of a fine woven-wire printing screen designed for use in the machine, the screen being shown shaped as when in working position on the impression, pressure and guide rollers.
Figs. 16 and 17 are diagrams to a greatly magnified scale of alternative examples of a joint between ends of the screen as woven.

The machine has a frame comprising mainly side cheeks 20 (Figs. 1, 2 and 12), horizontal members 21 and upper pedestals 22 and 23 (Fig. 3) respectively at the near and far sides of the machine. The main components of the machine are an impression roller 24, which has a metal body sheathed by a rubber cylinder presenting the rolling surface of the roller, a smooth steel pressure roller 25, which is smaller than the impression roller, and a smooth steel guide roller 26 which is similar to the pressure roller. These three rollers are all parallel, having at their ends axles which are journalled in appropriate bearings. When the machine is prepared for use, the rollers are fitted with an endless printing screen 27 composed of fine woven wire (Figs. 15, 16 and 17). The machine also includes intake rollers 28 (Fig. 1) which serve to lead a fabric 29 to be printed to the underside of the impression roller 24. These rollers 28 have their axles journalled in bearings 30 on brackets 31 extending from the side cheeks 20.

The axles 32 of the pressure roller 25 are journalled in bearings 33 which have stationary locations on the pedestals 22 and 23. That is to say, the roller 25 is rotatable about a constant axis. The axles 34 of the impression roller 24 are journalled in bearings 35 which are carried by lever arms 36. These arms are fulcrumed in stationary bearing blocks 37 on the side cheeks 20. The arms 36 are supported by two pneumatic devices, one for each arm. Each of these devices consists of a cylinder 38 and a piston of which the rod is indicated by 39. The cylinder has a pivotal anchorage at 40 on the associated side cheek 20, and the piston-rod is pivotally connected at 41 to the associated lever arms 36. Thus, it will be apparent that the impression roller 24 is movable to and from the pressure roller 25 about the axis of the blocks 37 under the control of the devices 38, 39. The axles 42 of the guide roller 26 are journalled in bearing blocks 43 and 44 (Fig. 6) on the pedestals 22 and 23. These bearing blocks are both adjustable in unison in the direction to or from the pressure roller 25. By virtue of this adjustability, the tension of the screen 27 can be regulated. Moreover, the bearing block 43 at the near side of the machine is individually adjustable up and down perpendicular to the plane which contains the axes of the roller axles 32 and 42. By virtue of the latter adjustability, the guide roller 26 may be set with its axis precisely parallel to, or at a slight deviation from precise parallelism with, the axis of the pressure roller 25.

The means for adjusting the bearing blocks 43 and 44 in unison comprise a long shaft 45 (Figs. 3 and 4), which is turnable in the side pedestals 22, 23 and has a handwheel 46 for turning it, a pair of worms 47 on the shaft, rotatable wormwheels 48 (Figs. 4 and 6), meshing with the worms, and screws 49 which are rigidly keyed to the wormwheels. These screws 49 are rotatable in screw-threaded engagement with the bearing blocks 43 and 44, respectively. These blocks are slidable in slideways 50 in the pedestals. The blocks support bearings 51 for the axles 42. Each bearing 51 incorporates a ball-bearing 51A. The arrangement is such that, if the handwheel 46 is turned one way or the other, the screws 49 are correspondingly rotated and will move the blocks 43 and 44 equally to or from the pressure roller 25.

The means for adjusting that one of the bearings 51 which is carried by the block 43 comprise (see Figs. 7 to 11) a grub-screw 52, which is turnable by a hand-tool that can be inserted through a slot 53 in the pedestal 22, a plain half-hole 54 in the block 43 in which the grub-screw is freely turnable but it is located against up and down movement, and a screw-threaded half-hole 55 in the bearing 51 engaged by the grub-screw. The bearing 51 is arranged to slide up and down to a slight extent in the block 43. The arrangement therefore is such that, when the grub-screw 52 is turned one way or the other, the bearing 51 will be raised or lowered correspondingly. Studs 56 (Fig. 7) projecting from the block 43 through vertical slots in the bearing block 51 have nuts 57 by which the block can be secured in its position of vertical adjustment.

Figures 4, 5, 6:
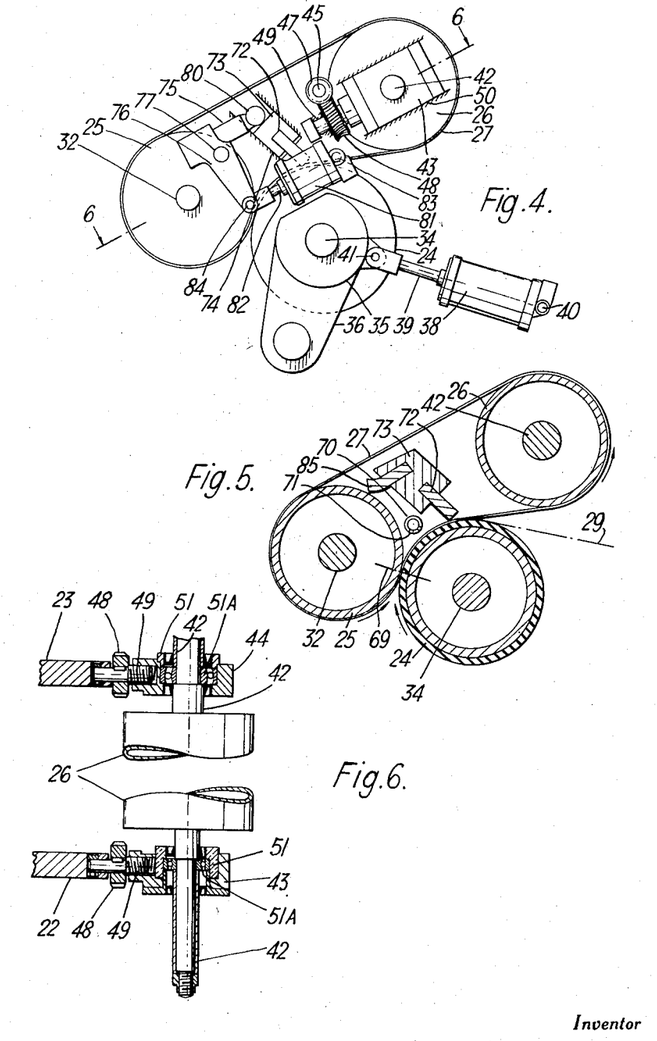
Fig. 4 is a sectional elevation, drawn to a larger scale than Fig. 1, of the impression, pressure and guide rollers and associated parts of the machine, other parts being removed for clearness.
Fig. 5 is a view corresponding to Fig. 4, being a section on the line 5—5 of Fig. 3.
Fig. 6 is a section on the line 6—6 of Fig. 4.

The bearings 33 and 51 at the far side of the machine are of the self-aligning type. That is to say, these bearings are designed to permit pivotal, or angular, movement of the respective axles 32, 42, as illustrated by Fig. 6 in regard to the axle 42 and far-side ball-bearing 51A.

The pressure roller 25 is positively driven to rotate in its bearings, the guide roller 26 is geared to the pressure roller so that the cylindrical surfaces of both rollers rotate at the same linear speed, the printing screen 27 travelling in its endless path at the same speed. However, the impression roller is free to rotate in its bearings, being constrained to do so in the operation of the machine through frictional connection with the screen 27, as hereinafter described. In the example, the pressure roller 25 is driven from an electric motor 60 (Fig. 1) through reduction gearing (not shown) and chain-and-sprocket gearing at the far side of the machine comprising a driving sprocket wheel 61, a driving chain 62 and a driven sprocket wheel 63; these parts 61 to 63 are provided in duplicate, the double wheel 63 being shown in Fig. 3. The double wheel 63 is secured to the axle 32 at the far end of the pressure roller 25. The wheel 63 is integral with a driving sprocket wheel 64 which through a chain 65 drives a sprocket wheel 66 on the axle 42 at the far end of the guided roller 26. This chain is tensioned by a jockey wheel 67 which is journalled on a bracket 68 carried by the pedestal 23. The bracket is adjustable to regulate the tension of the chain 65.

The roller-driving gearing 61 to 67, being all arranged at the far-side of the machine, leaves the rear side unobstructed. This feature has significance in regard to the work of fitting and removing the printing screen 27.

The arrangement of the main rollers of the machine is such that the pressure roller 25 is at one side of the impression roller 24 and reaches a rather higher level, whereas the guide roller 26 is at the opposite side and is higher still. When a screen 27 is fitted to the rollers and pressure is exerted by the pneumatic devices 38, 39, a powerful nip is created between the impression and pressure rollers along the plane indicated by the line 69 in Fig. 5. It will be seen that this nip opens upwards, the surfaces of the pressure roller 25 and screen 27 immediately above the nip forming a V-shape receptacle for surplus printing ink, which is supplied to the screen 27 by a long feed pipe 70 extending from side-to-side of the machine. The pipe 70 has appropriate nozzles 71 by which the ink is distributed across the surface of the screen.

The machine has a device applicable to the screen 27 for squeezing printing ink uniformly through it. This device includes as its chief component a squeegee 72 (Figs. 4 and 5) consisting of a rubber or equivalent slat-like member formed with an edge in the manner customary for screen printing. The squeegee is adjustably supported to extend above the top of the impression roller 24, being located just beyond the feed pipe 70. The support of the squeegee is a bar 73 which is movable at its ends in guides 74 on the pedestals 22, 23. In the example, the ends of the bar 73 are associated with pressure-applying levers under the control of pneumatic devices. Each of these levers is a bell-crank 75, 76 fulcrumed at 77 in the associated pedestal 22 or 23. Each bell-crank includes an arm 75 which has at its end a ball 80 adapted to press upon the bar 73. Each arm 75 is detachable from the main body 76 of the bell-crank, being slidable when detached into the main body 76 to occupy a position clear of the bar 73. Each of the pneumatic devices comprises a cylinder 81 and a piston of which the rod is indicated by 82. The cylinder is pivotally anchored at 83 on the associated pedestal 22 or 33 and the piston-rod end is pivotally connected at 84 to the lever arm 76. The arrangement is such that, in the operation of the machine, the devices 75, 76 individually exert pressures upon the opposite ends of the bar, which pressures are transmitted to the squeegee 72 which presses upon the screen 27.

The balls 80 constitute a simple one-way connection with the ends of the squeegee bar 73, the arrangement being such that when the lever arms 75 are withdrawn the bar can be slid out of its guides 74.

Therefore, it will be apparent that the machine, as so far described with reference to the drawings, comprises a rotatable impression roller 24, a rotatable pressure roller 25 and a rotatable guide roller 26, the pressure and guide rollers being adapted to be wrapped by an endless flexible printing screen 27 and the impression roller being arranged so that a comparatively short arcuate zone of it supports the screen between the other two rollers 25, 26, a conduit 70, 71 for feeding printing ink to the screen above the arcuate zone, a device 72, 73 applicable to the screen at said zone for squeezing the printing ink through the screen, mechanism comprising the gearing 61, 62, 63 for continuously rotating the pressure roller and releasable means 38, 39 for forcing the impression roller towards the pressure roller to form with it a nip at 69, at the start of said zone, by which nip the screen will be forced to travel in an endless path, within which the conduit and ink-squeezing device are mounted, the path extending from the nip to the ink-squeezing device, there leaving the impression roller and returning around the guide roller 26 and the pressure roller 25, back to the nip.

The machine has a cleaning device which is applied to the surface of the pressure roller 25 to return ink therefrom towards the screen. This device is a second squeegee 85 (Fig. 5) also consisting of a rubber or equivalent slat-like member supported by the same bar 73, being arranged alongside the ink-squeezing squeegee 72 and being applied like a doctor blade to wipe the surface of the pressure roller just above the ink receptacle.

By virtue of the features described, practical advantages are attained, namely: The printing screen 27 and the fabric 29 are in contact during only the short arcuate zone of the resilient surface of the impression roller 24 extending from the nip 69 to the squeegee 72, the application of printing ink being confined to this zone. Seeing that the printing screen 27 has completed its work when it leaves the squeegee 72, it parts there from the impression roller, so that the printed fabric as indicated by the dot-dash line 29 in Fig. 5 can be parted from both the screen and the impression roller practically at the squeegee. Thus, instantly after the printing work is done, the screen and fabric separate; and so there is no danger that the damp printed pattern will be mudged by distortion or shrinkage or other motion of the fabric relative to the screen. Moreover, there is no danger that the ink of the printed pattern will seep through the fabric and sully the impression roller. Because of this last-mentioned advantage there is no need to use a detachable blanket of cloth or felt as a backing for the fabric in its passage through the machine, the use of some such blanket being customary in printing with stencilled screens.

With reference to the pneumatic devices 38, 39 applied to the axles of the impression roller 24 and with reference to the pneumatic devices 81, 82 applied to the ends of the squeegee bar 73, each of these four devices as already stated consists of a cylinder and a piston. Each device is single-acting; that is to say, compressed air is admissable to one end only of the cylinder. Thus, in each device the piston rod can be forced outwards only from the cylinder. The return motion of the piston rods is derived from compression springs (not shown) which may be located in the cylinders and applied to the backs of the pistons. That is, each piston rod is movable in one direction by the action of compressed air and is returnable by spring action whenever the compressed air is released.

Figure 12:
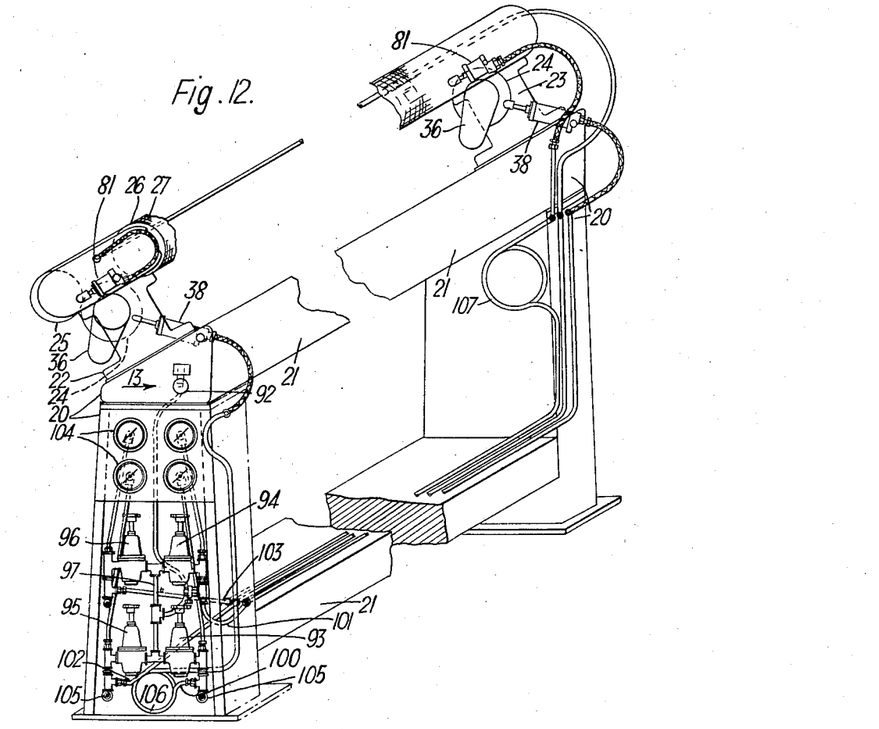
Fig. 12 is a view in diagrammatic perspective of both sides of the machine showing pneumatic devices applied to the impression and guide rollers and a system of piping and valves for the operation of these devices.
Figure 13:
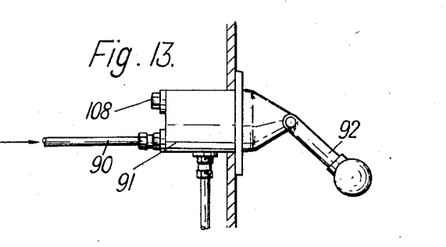
Fig. 13 is a detail view in the direction of the arrow 13 in Fig. 12.
Figure 14:
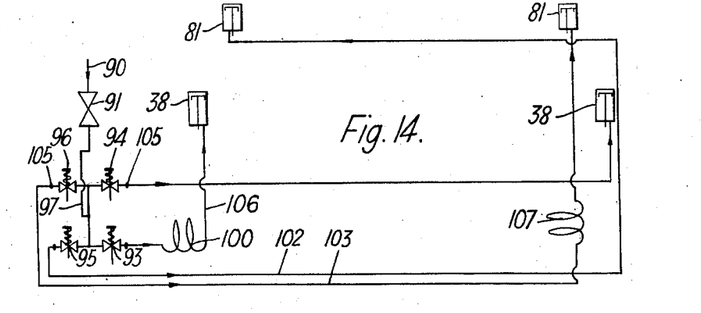
Fig. 14 is a diagram of the hydraulic system.

The four pneumatic devices have their cylinders 38, 38, 81 and 81 all connected in a pneumatic system illustrated by Figs. 12, 13 and 14. This system comprises an inlet pipe 90 leading from a source of compressed air to a main valve 91 with a control handle 92; four reducing valves 93, 94, 95 and 96 all connected in parallel through piping 97 with the outlet side of the valve 91; and four lengths of piping 100, 101, 102 and 103 each leading from one of the reducing valves to the appropriate one of the four cylinders 38, 38, 81 and 81. Each reducing valve, at its outlet side, has a pressure gauge 104 indicating the pressure being applied to the associated one of the cylinders 38, 38, 81 and 81. Moreover, each reducing valve, at its outlet side, has a hand-controlled leak device 105 consisting of a small escape valve; this is a device which the worker in charge of the apparatus can close or can open to a precisely regulatable extent so as to permit air to escape from the system to atmosphere. Seeing that the lengths of piping 101 and 103 have to be extended to the far side of the machine and seeing that it is desirable that the lengths of piping to the cylinders 38 and 81 at one side shall have the same volumes as the lengths of piping to the cylinders 38 and 81, respectively, at the opposite side, the lengths 100 and 102 incorporate equalising coils 106 and 107 respectively. The chest of the main valve 91 holds a second valve 108 (Fig. 13) which when opened under the control of the same handle 92 exhausts the entire system beyond the main valve 91 to atmosphere. Each of the reducing valves 93—96 acts, in a manner known per se, when the associated leak device is opened to reduce the pressure of the air supplied to the associated cylinder to an extent proportionate to the extent of opening of the leak device; and the pressure is indicated by the associated one of the four pressure gauges 104.

Thus, it will be manifest that, as regards the impression roller 24, the forces applied to the axles at its opposite ends by the two pneumatic devices 38, 39 can be independently regulated by the worker by manipulating either or both of the appropriate leak devices 105. Similarly, as regards the ink-squeezing squeegee 72 (and with it the cleaning squeegee 85) the forces applied to the bar 73 at its opposite ends by the two pneumatic devices 38, 39 can be independently regulated. Accordingly, the pressures exerted by the impression roller 104 and the squeegee 72 can be precisely adjusted so as to be evenly distributed from side to side of the machine.

Figure 7:
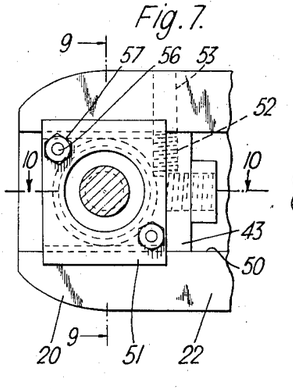
Fig. 7 is a sectional elevation, drawn to a large scale, of one of the bearings of the guide roller, the section being on the line 7—7 of Fig. 3.
Figure 8:
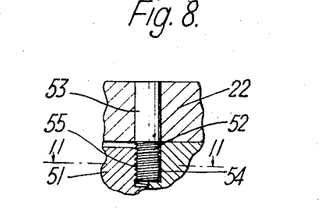
Fig. 8 is a section of a portion of Fig. 7.
Figure 9:
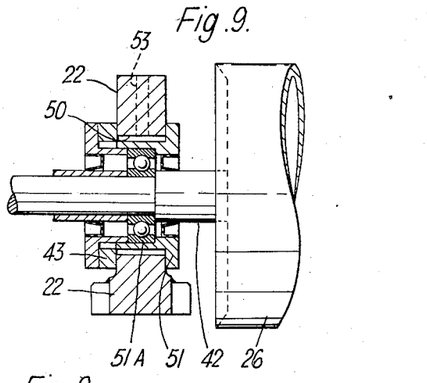
Figs. 9 and 10 are sections on the lines 9—9 and 10—10 respectively of Fig. 7.
Figure 10:
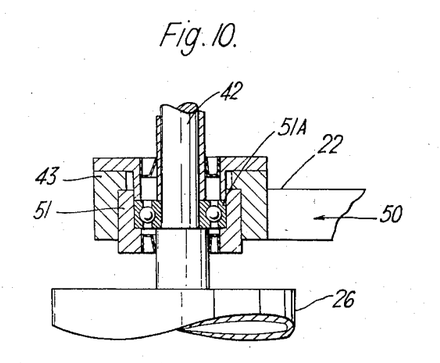
Figure 11:
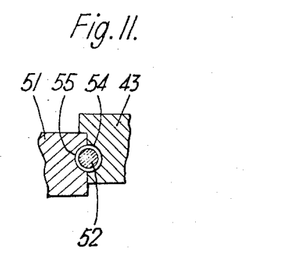
Fig. 11 is a section on the line 11—11 of Fig. 8.

With reference to the endless printing screen 27, illustrated by Figs. 15 and 16, the manufacture thereof by weaving a metal web of fine round-section wires and by cutting and jointing its ends, at 110, Fig. 15, is performed as in the manufacture of wire fabrics used for the production of paper by the Fourdinier type of paper-making machines. The jointing is performed by welding the ends of registering warp wires 111 so as to form a joint which does not noticeably affect the continuity and uniformity of the warp-and-weft structure. The fineness of the wire and the weave may vary from fabrics as "coarse" as say twenty wires per inch to fabrics so very fine as say two hundred wires per inch. In the case of the finer fabrics, jointing may be effected alternatively by welding juxtaposed end wefts 112 side-by-side together and to the warp ends, as Fig. 7 illustrates. The jointing even in this alternative is also such that the continuity and uniformity of the warp-and-weft structure is not noticeably interrupted.

The endless screen is of a length appropriate to the incorporation in it of a predetermined number of stencils; that is to say, stencils each representing a single full-width complete "repeat" of the patterns to be printed in succession. The stencilling is applied by known photographic means. For instance, the screen may be coated with a light-sensitive solution of bichromated polyvinyl alcohol, which is dried and then exposed to light with a reproduction of each pattern applied to it, after which the coat is washed with water, leaving a negative reproduction of the pattern affixed as a film stencil to the screen.

By virtue of the continuity and uniformity of the warp-and-weft structure through the joint at 110, Fig. 15, the joint may be disregarded in relation to the pattern; that is to say, the pattern may extend across the joint.

The apparatus will include other rollers for the supply to the machine of the fabric 29 to be printed, say a long sheet of textile cloth from a cloth roll.

When the machine is out of use, the handle 92 is positioned so that the main valve 91 is closed and the second valve 108 is open to exhaust. Thus, the piston rods 39, 82 are all withdrawn, so that the impression roller 24 is released, being slightly lower than its working position. Moreover, the bell-crank arms 75 are slid into their non-obstructive position, and the squeegee bar 73 is removed from the machine.

Figure 2:
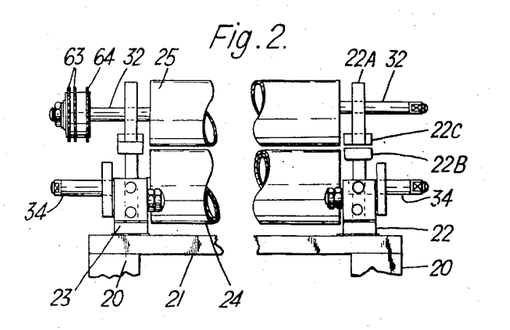
Fig. 2 is a front elevation of both sides of the machine viewed at an inclination as indicated by the arm 2 in Fig. 1.
Figure 3:
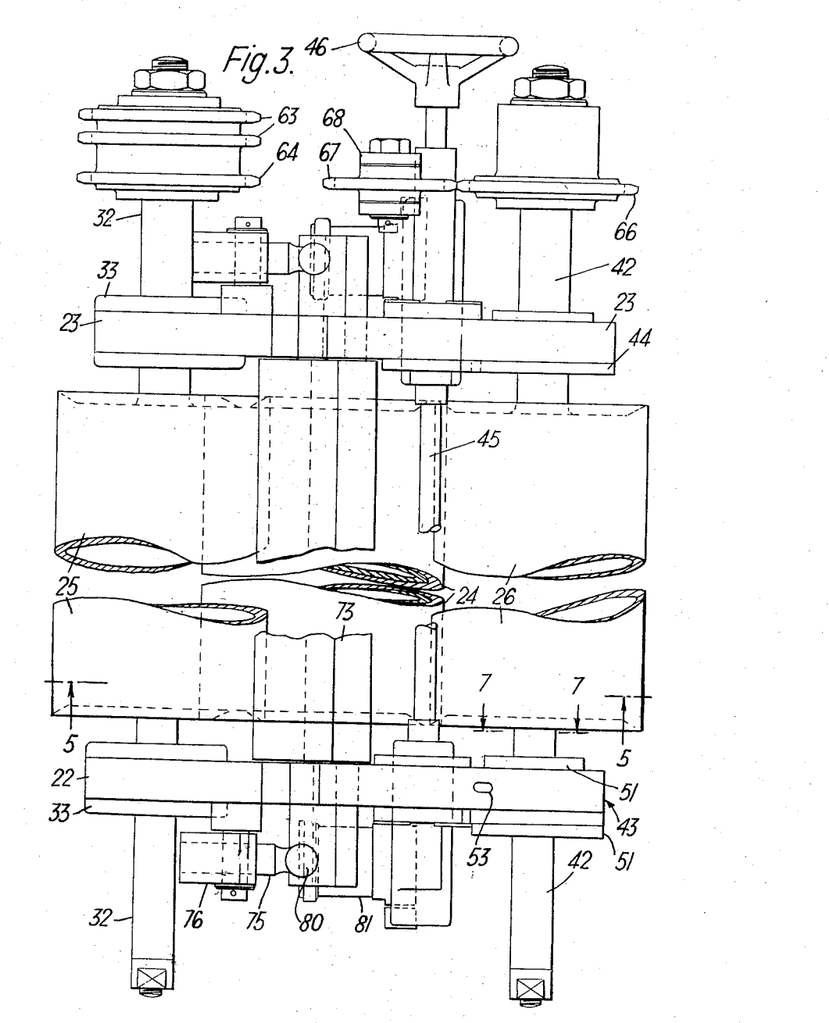
Fig. 3 is a top plan of the sides of the machine in the direction of the arrow 3 in Fig. 1.

Preparatory to the use of the machine, a selected printing screen 27 must be fitted. In order to do so, the worker tilts the pressure and guide rollers 25, 26 about the self-aligning bearings 33, 51 at their far ends by lifting them at their near ends, as illustrated by Fig. 2. For this purpose, the pedestal 22 at the near side of the machine has an upper portion 22A in which the associated axles 32, 42 are journalled and which is detachable from the remainder of the pedestal; that is to say, the pedestal and its upper portion have inter-engageable joint parts 22B and 22C which are normally bolted together but which can be unbolted and temporarily separated as shown. This tilting of the rollers 25, 26 provides a gradually widening gap between them and the impression roller. Thus, the screen 27 can be slid into position from the near side of the machine, which side as aforesaid is unobstructed by roller-driving mechanism (the gearing 60 to 67 all being at the far side).

When the screen 27 is positioned, the squeegee bar 73 is fitted into its guides 74 with the two squeegees 72 and 85 bearing upon the screen 27 and roller 25, respectively; and the bell-crank arms 75 are repositioned for use. The joint parts 22B, 22C (Fig. 2) are bolted together again, thus narrowing the gap between the impression roller below and the pressure roller above. The handle 92 is moved to close the exhaust valve 103 and open the main valve 91. Thus, compressed air is admitted to the four cylinders 38 and 81, so that the impression roller 24 is forced to exert the requisite powerful nip at 69 on the screen 27, and the squeegees 72 and 85 are pressed against the screen and the pressure roller respectively. The motor 60 is started, the fabric 29 is led into the machine and printing ink is supplied to the feed pipe 70 and distributed across the screen 27. The ink will flow downwards towards the V-shaped receptacle into which the nip opens, and so the whole surface of the screen will be inked preparatory to the ink-squeezing action of the squeegee 72.

Seeing that surplus ink will flow from the ends of the receptacle, it is preferable to fit ink receiving trays below both ends of the machine and return the overflow to the source of supply.

The apparatus may also include a long endless band to which the printed sheet 29 is led from the machine for drying, said band passing around rollers at least one of which is driven in cooperation with the impression and other rollers, preferably at a slightly greater speed so as to impose a light tension upon the outgoing printed fabric.

Although the example of apparatus described has been designed to print a long continuous sheet of fabric, it will be manifest that the apparatus could be adapted to print sheets fed to it in succession. That is to say, there could be incorporated in the apparatus a sheet-feeding mechanism geared to the impression and pressure rollers to operate in synchronism therewith and to feed sheets in succession to the nip, each sheet to be in register with the pattern to be printed.

Although in the example, the impression roller has a rubber surface, there may be provided alternatively, or if desired additionally, a blanket composed of cloth or felt as a base for the fabric being printed.

In the example, the impression roller is freely rotatable and therefore rotates by friction, but it may instead be positively driven.

In the example, there is a single guide roller to cooperate with the pressure roller to support the endless printing screen. Where larger screens are to be used the machine may have more than one guide roller.

I claim:

1. A continuously operating screen printing machine comprising rotatable impression, pressure and guide rollers, the pressure and guide rollers being adapted to be wrapped by an endless flexible printing screen and the impression roller being arranged so that an upwards facing arcuate zone of it supports the screen between the other rollers, a conduit for feeding printing ink to the screen above said zone and distributing the ink across the screen, a device applicable to the screen at the end of said zone for squeezing the printing ink through the screen, mechanism for continuously rotating the pressure roller and releasable means for forcing one of the impression and pressure rollers towards the other to form at the start of said zone a linearly concentrated nip by which the screen will be forced to travel continuously round said zone from the nip to the ink-squeezing device and thence back around the guide and pressure rollers to the nip, said guide roller being arranged to lead the printing screen tangentially from the impression roller immediately beyond said squeezing device.

2. A screen printing machine according to claim 1 in which the assembly constituted by the pressure and guide rollers, to ensure the maintenance of precise alignment of the printing screen, has means for angularly adjusting the axis of one of said rollers in relation to the axis of the other and in a direction perpendicular to a plane approximately containing both of said axes.

3. A screen printing machine according to claim 1 in which the guide roller is journalled at its ends in bearing blocks which are slidable in guides to and from the pressure roller, and in which worm-and-screw adjusting mechanism is applied to said blocks for adjusting both ends of the guide roller in unison.

4. A screen printing machine according to claim 2 in which an axle at one end of the guide roller is journalled in a bearing and in which this bearing has a screw device for adjusting it up and down in a bearing block so that the axis of the guide roller is angularly adjustable in relation to the axis of the pressure roller.

5. A screen printing machine according to claim 4 in which the pressure roller is journalled in stationary bearings to rotate about an axis that is constant whereas the impression roller is journalled to rotate in bearings which are movable and which are subjected to the force of means by virtue whereof the impression roller forms the nip with the pressure roller.

6. A screen printing machine according to claim 5 in which the bearings of the impression roller are at opposite ends thereof and are subjected to forces applied by separate devices independently controlled to regulate the distribution of pressure throughout the extent of the nip.

7. A screen printing machine according to claim 5 in which the impression roller is supported at its opposite ends in levers which are under the control of force-applying cylinder-and-piston devices.

8. A screen printing machine according to claim 7 in which the cylinders are connected separately in a pressure system having means for adjusting independently the forces applied by said devices.

9. A screen printing machine according to claim 8 in which the pressure system is pneumatic and the adjusting means are reducing valves each associated with an adjustable leak.

10. A screen printing machine according to claim 1 in which the ink-squeezing device is carried by a bar opposite ends of which are subjected to forces applied by separate cylinder-and-piston devices.

11. A screen printing machine according to claim 10 in which the cylinders are connected separately in a pneumatic system under the control of means for adjusting said forces independently.

12. A screen printing machine according to claim 11 in which the adjusting means are reducing valves each associated with an adjustable leak.

13. A screen printing machine according to claim 1 having driving mechanism applicable to the pressure and guide rollers at one side of the machine, leaving the opposite side unobstructed.

14. A screen printing machine according to claim 13 in which the pressure and guide rollers have axles at the side adjacent to the driving mechanism journalled in self-aligning bearings facilitating tilting of said rollers upwards at their opposite ends in order to form a gap there for insertion of the printing screen.

15. A screen printing machine according to claim 1 in which the ink-squeezing device is under the control of a lever including an arm which is withdrawable to facilitate removal of said device from the machine.

References Cited in the file of this patent

UNITED STATES PATENTS

| Number | Name | Date |
|---|---|---|
| 636,071 | Sharp | Oct. 31, 1899 |
| 1,055,597 | Baird | Mar. 11, 1913 |
| 1,421,884 | Yohns | July 4, 1922 |
| 1,573,494 | Hinnekens | Feb. 16, 1926 |
| 1,771,627 | Hart | July 29, 1930 |
| 2,054,152 | Wood | Sept. 15, 1936 |
| 2,302,152 | Snyder | Nov. 17, 1942 |